(12) United States Patent  
Anderson

(10) Patent No.: US 8,756,823 B2  
(45) Date of Patent: Jun. 24, 2014

(54) OUTLET DETECTOR SYSTEM

(76) Inventor: Blaine A. Anderson, Maiden Rock, WI (US)

(*) Notice: Subject to any disclaimer, the term of this patent is extended or adjusted under 35 U.S.C. 154(b) by 150 days.

(21) Appl. No.: 13/339,126

(22) Filed: Dec. 28, 2011

(65) Prior Publication Data

US 2012/0216415 A1     Aug. 30, 2012

Related U.S. Application Data

(60) Provisional application No. 61/427,718, filed on Dec. 28, 2010.

(51) Int. Cl.  
*B25H 7/00* (2006.01)  
*G01B 3/14* (2006.01)  
*G01B 5/00* (2006.01)  
*G01B 7/00* (2006.01)

(52) U.S. Cl.  
USPC ............... 33/528; 33/DIG. 10; 33/DIG. 1; 116/204

(58) Field of Classification Search  
USPC ............ 33/528, DIG. 10, DIG. 1; 116/204  
See application file for complete search history.

(56) References Cited

U.S. PATENT DOCUMENTS

| | | | | |
|---|---|---|---|---|
| 3,884,280 A * | 5/1975 | Chailer | | 144/73 |
| 3,924,331 A * | 12/1975 | Goosen | | 30/366 |
| 4,096,964 A * | 6/1978 | Glick | | 220/3.4 |
| 4,194,644 A * | 3/1980 | Narvaez | | 220/3.3 |
| 4,209,103 A * | 6/1980 | Glovier | | 220/3.4 |
| 4,384,396 A * | 5/1983 | Smolik | | 29/407.09 |
| 4,388,890 A * | 6/1983 | Wester et al. | | 116/204 |
| 4,538,354 A * | 9/1985 | Smolik | | 408/72 B |
| 4,953,733 A * | 9/1990 | Loscuito | | 220/3.4 |
| 6,708,421 B1 * | 3/2004 | Crorey | | 33/613 |
| 6,729,034 B1 * | 5/2004 | Capstran | | 33/528 |
| 6,867,369 B2 * | 3/2005 | Wiggins | | 174/58 |
| 7,367,131 B1 * | 5/2008 | Hordis | | 33/528 |
| 7,434,327 B2 * | 10/2008 | Crorey | | 33/528 |
| 7,572,978 B1 * | 8/2009 | Keith, Jr. | | 174/58 |
| 7,661,201 B1 * | 2/2010 | Hordis | | 33/528 |
| 7,845,089 B1 * | 12/2010 | Lavalle | | 33/528 |
| 7,926,195 B2 * | 4/2011 | Crorey | | 33/528 |
| 2012/0174425 A1 * | 7/2012 | Clarke | | 33/528 |

* cited by examiner

*Primary Examiner* — Christopher Fulton  
(74) *Attorney, Agent, or Firm* — Patterson Thuente Pedersen, P.A.

(57) ABSTRACT

A system and related methods for locating an electrical box through a covering material. The system utilizes a magnetized seeker disk in combination with a magnetized mounting disk that is mounted within an opening on an electrical box. The mounting disk attaches to the electrical box by being wedged into and displacing/deflect a perimeter wall of the electrical box. The electrical box is then covered by sheetrock or any other wall or ceiling covering. The seeker disk is placed on top of the covering near where the electrical box is thought to be located. By operation of the embedded magnets, the seeker disk signals the precise location of the electrical box by interacting with the previously mounted insert disk.

6 Claims, 14 Drawing Sheets

US 8,756,823 B2

OUTLET DETECTOR SYSTEM

PRIORITY CLAIM AND RELATED APPLICATION

The present application claims priority to U.S. Provisional Application Ser. No. 61/427,718, filed Dec. 28, 2010 and entitled "OUTLET DETECTOR SYSTEM", which is hereby incorporated by reference in its entirety.

FIELD OF THE INVENTION

The present invention relates generally to tools used in the construction of buildings. More specifically, the present invention relates to a system for determining the location of an electrical box through a wall covering material.

BACKGROUND OF THE INVENTION

The majority of building construction follows the same general standardized building process steps. With respect to the steps at issue for the present invention, after a room has been framed, the electrical is roughed-in, which includes mounting desired electrical boxes flush with the wall studs and threading wires through the framing and into the boxes. Electrical boxes can include, for example, outlets, switches, lights, or fans. After the electrical has been roughed-in, Sheetrock® or wallboard or other covering is installed over the mounted box. Because the covering then masks the location of the various electrical boxes, a method of locating the boxes must be used. Traditionally, the locations of electrical boxes and plumbing outlets were derived based on various hand-recorded pre-covering measurements of the distance of the box relative to the walls, ceiling, or floor. This is a time-consuming and often inaccurate way of locating the boxes.

However, these systems all suffer from one or more problems like ease of use, alignment difficulties, or not facilitating the secondary covering removal step, among others. Thus, there is a need for a system of efficiently and easily locating an electrical box through a covering material and facilitating the removal of the covering material.

SUMMARY OF THE INVENTION

A system of locating an electrical box through a covering material that facilitates the removal of the covering material according to embodiments of the present application substantially meets the aforementioned needs of the industry. The system according to embodiments of the invention is designed to locate electrical boxes by utilizing a magnetized seeker disk in combination with a magnetized mounting disk that is mounted to an electrical box. Generally, the magnetized mounting disk includes a mounting perimeter that interacts with a perimeter wall of the electrical box such that the perimeter wall is at least partially displaced/deflected such that the magnetized mounting disk is wedged within an opening of the electrical box. With the magnetized mounting disk attached to the electrical box, the electrical box can then be covered by Sheetrock® or wallboard or any other wall or ceiling covering. The seeker disk is placed on an exposed surface of the covering near where the electrical box is thought to be located. By operation of the opposite polarity of the embedded magnets, the seeker disk signals the precise location of the electrical box by interacting with the mounting disk. After a precise location of an electrical box has been determined, the system allows for a location to place a guiding drill bit on a hole saw through a central aperture on the seeker disk so as to remove the covering material exactly in the shape and location of the electrical box, thus allowing access to the electrical box. As the drill bit pierces the covering material, the drill bit enters a central aperture on the mounting disk whereby the seeker disk, covering material and mounting disk are simultaneously removed in the hole saw so as to expose the electrical box. This "no measure" cutting thus allows for wall covering removal by precise and efficient means such that traditional measure-and-cut methods are no longer needed.

The size and shape of the locator system can be made in any number of styles to fit any number of generally round electrical boxes. For example, the mounting disk can be made with or without depressions for electrical box ears. The mounting disc can be made to accommodate electrical boxes having different diameters or depth recesses for different sized electrical box ears. In one representative embodiment, the mounting disk can be made in a non-round or slightly out of round configuration such that it secures to the electrical box, plumbing fixture, or heating fixture through a camming action wherein the mounting disk is wedged into an opening in the electrical box. Generally, the mounting disk secures itself to the electrical box by pressure or force applied to the walls of the electrical box via the interaction of the out of round or non-round mounting perimeter of the mounting disk with the perimeter wall of the electrical box such that the perimeter wall is slightly displaced/deflected. Time and material costs are avoided in that mechanical fasteners are not required to attach and retain the mounting disk within the opening of the electrical box. In another non-round embodiment, the mounting disk can be made such that it only covers a portion of the opening of the electrical box. In this way, manufacturing costs are lowered by using less material for the mounting disk. One representative example of a non-round mounting disk comprises a pair of opposed straight sides and pair of opposed arcuate portions, wherein the opposed arcuate portions interface with the perimeter wall of the electrical box without requiring all of the material that a generally round disk.

Alternatively, the system can utilize one shape of detector with a second shape of converter template to be able to accommodate one shape of electrical box and second shape of desired exterior outlet cover. For example, a round converter disk can contain a rectangular cutout in the center allowing for the mounting of a rectangular outlet or switch and also the use of a traditional (rectangular) outlet cover, when utilizing a round electrical box. Additionally, by mounting the plastic converter disk flush or slightly recessed, the converter disk can be mudded over to allow for typical wall treatment like painting, wall paper, or texture.

Thus, a device and method for locating an electrical box through a covering material is disclosed. The device comprises a magnetized mounting disk mounted in the center of an electrical box; and a magnetized seeker disk that can be placed against a surface of a covering material generally in proximity to the location of the electrical box such that the magnetic interaction between the mounting disk and seeker disk identifies the center of the electrical box behind the covering material.

Further, a method for locating an electrical box through a covering material and removing the covering material is disclosed, wherein the method generally comprises the steps of: attaching a magnetic mounting disk within an opening of a mounted electrical box; covering the mounting disk and electrical box with a wall covering; placing a magnetized seeker disk along the surface of the covering material in proximity to a known location of the electrical box; identifying the center of the electrical box by operation of magnetic interaction between the mounting disk and the seeker disk; and removing the wall covering in the shape of the electrical box by utilizing the previously-identified center.

The outlet detector system of the present invention is easily modified for a variety of applications, including identifying the precise location of, and "no measure" cutting for, dryer vents, plumbing applications, heating fixtures, etc.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE DRAWINGS

The invention can be completely understood in consideration of the following detailed description of various embodiments of the invention in connection with the accompanying drawings, in which.

Figure 1:
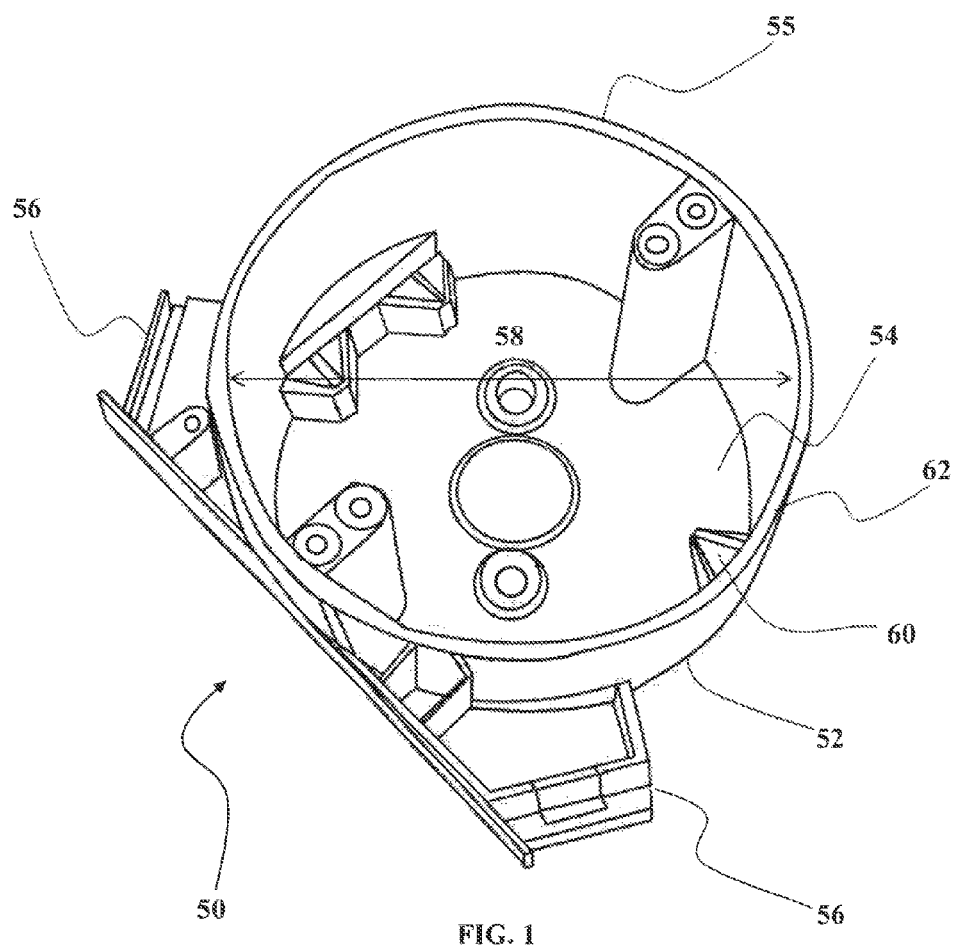
FIG. 1 is an illustration of an empty electrical box.

While the invention is amenable to various modifications and alternative forms, specifics thereof have been shown by way of example in the drawings. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

A conventional electrical box 50 is illustrated generally in FIG. 1. Electrical box 50 can be fabricated from a variety of electrically suitable and generally rigid materials. Electrical box 50 generally comprises a housing 52 defining an interior portion 54 surrounded by a circular perimeter wall 55. Circular perimeter wall 55 generally has a reduced wall thickness so that while the perimeter wall 55 is generally rigid, the perimeter wall 55 can be displaced/deflected when a force is applied. As illustrated, electrical box 50 includes a pair of mounting lugs 56 for mounting the housing 52 in a stud wall during construction. Housing 52 generally has an inner diameter 58 at an opening 60 that is defined flush across a mounting surface 62 of the perimeter wall 55. Depending upon a variety of factors, inner diameter 58 can have a wide range of values but in many conventional, residential installations, inner diameter 58 can be about 4 inches. Electrical box 50 can be utilized for a variety of ceiling mounting purposes including ceiling lights, ceiling fans, cameras, smoke alarms, exit signs and the like.

Figure 2:
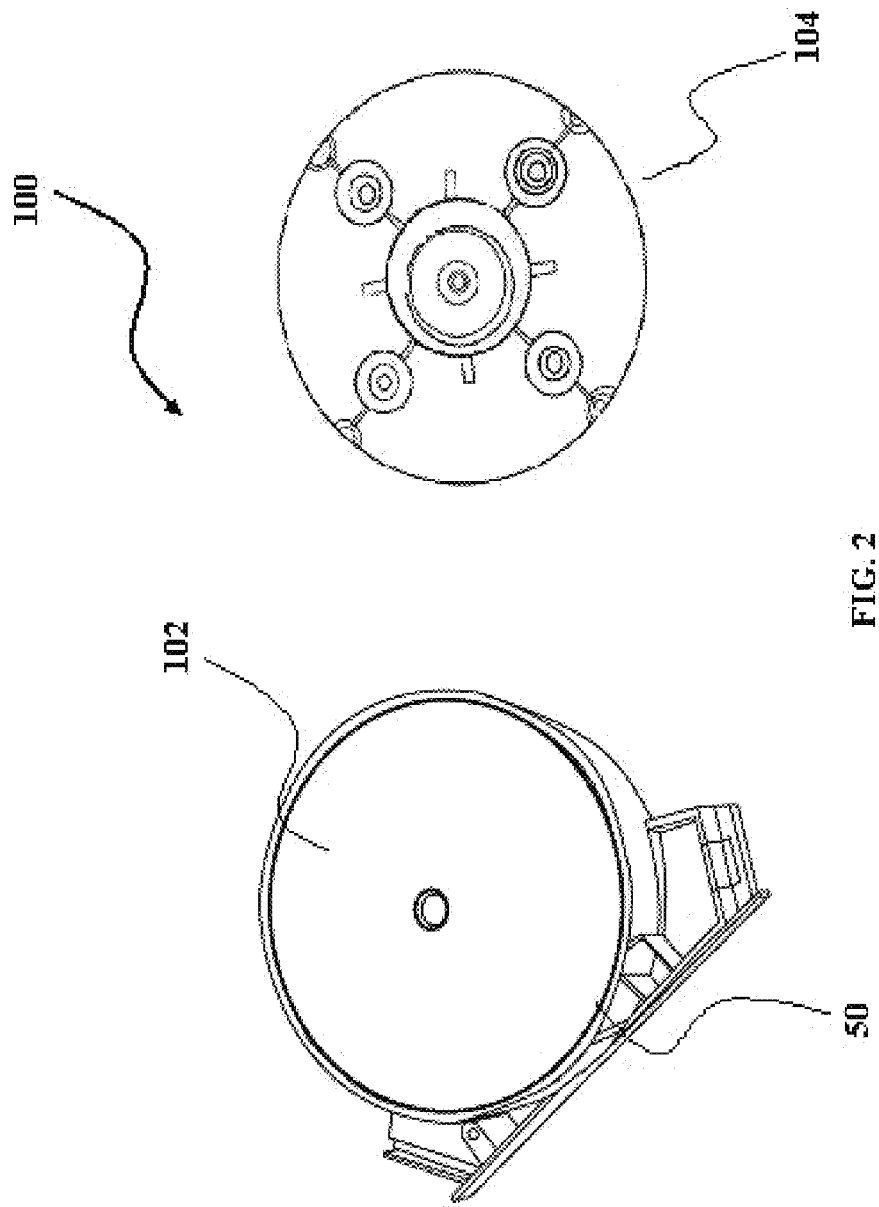
FIG. 2 is a top view of a locator system according to an embodiment of the present invention.
Figure 3:
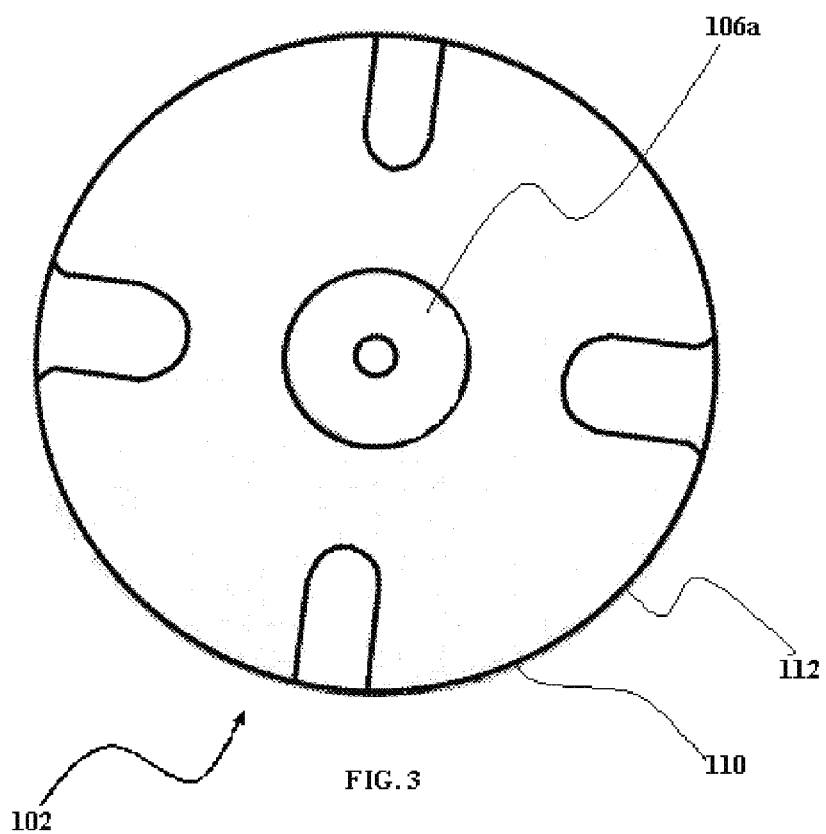
FIG. 3 is a top view of a mounting disk according to an embodiment of the present invention.
Figure 4:
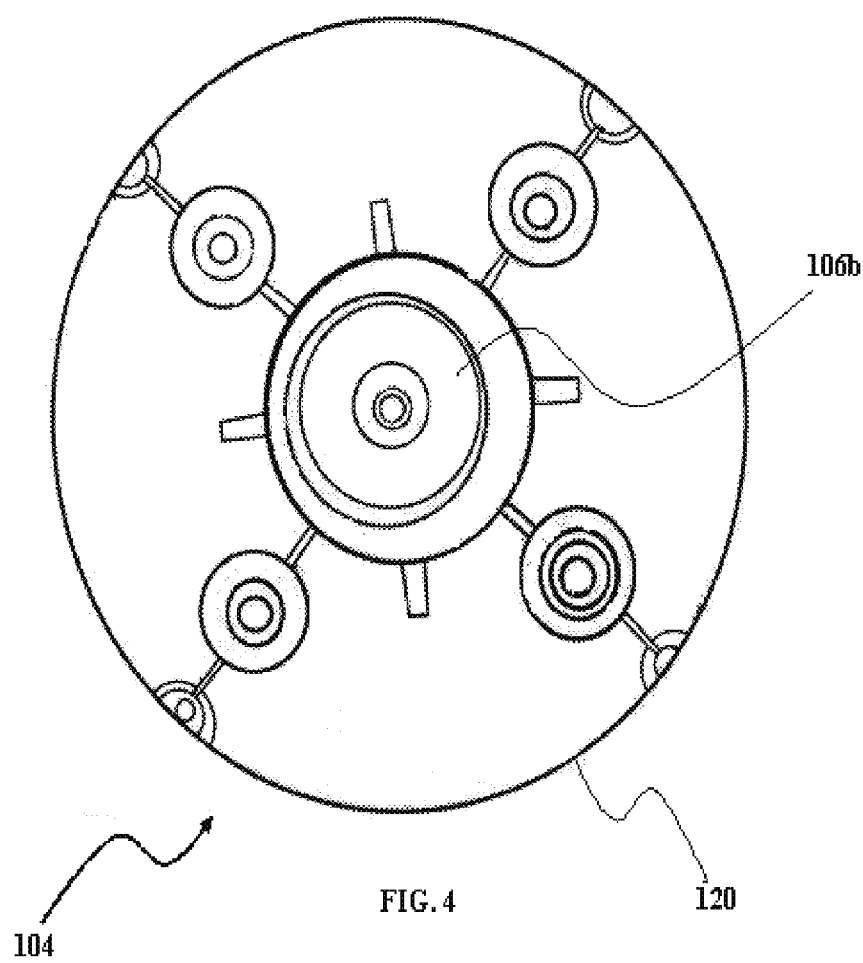
FIG. 4 is a top view of a seeker disk according to an embodiment of the present invention.

Referring now to FIG. 2, a representative embodiment of a locator system 100 can comprise a mounting disk 102 and a seeking disk 104. Mounting disk 102 and seeking disk 104 can be fabricated from a variety of suitable moldable materials including for example, polymers and copolymers such as Delrin. As seen in FIGS. 3 and 4, mounting disk 102 includes a mounting magnet 106a while seeking disk includes a seeking magnet 106b. Mounting magnet 106a and seeking magnet 106b are formed of the same magnetic material having opposite polarities so as to be strongly magnetically attracted to one another. Preferably, mounting magnet 106a and seeking magnet 106b are formed of a strong rare-earth magnetic material such as, for example, neodymium magnets. Mounting magnet 106a and seeking magnet 106b are preferably circular and can be overmolded during the formation of the mounting disk 102 and seeking disk 104 so as to be integral to the mounting disk 102 and seeking disk 104, respectively. Alternatively, mounting magnet 106a and seeking magnet 106b can be press fit into the mounting disk 102 and seeking disk 104, respectively. Alternatively, the mounting magnet 106a and seeking magnet 106b can be mounted within channels located in the mounting disk 102 and seeking disk 104. Mounting magnet 106a and seeking magnet 106b are identical in size and shape and each include a central aperture 108.

Figure 5:
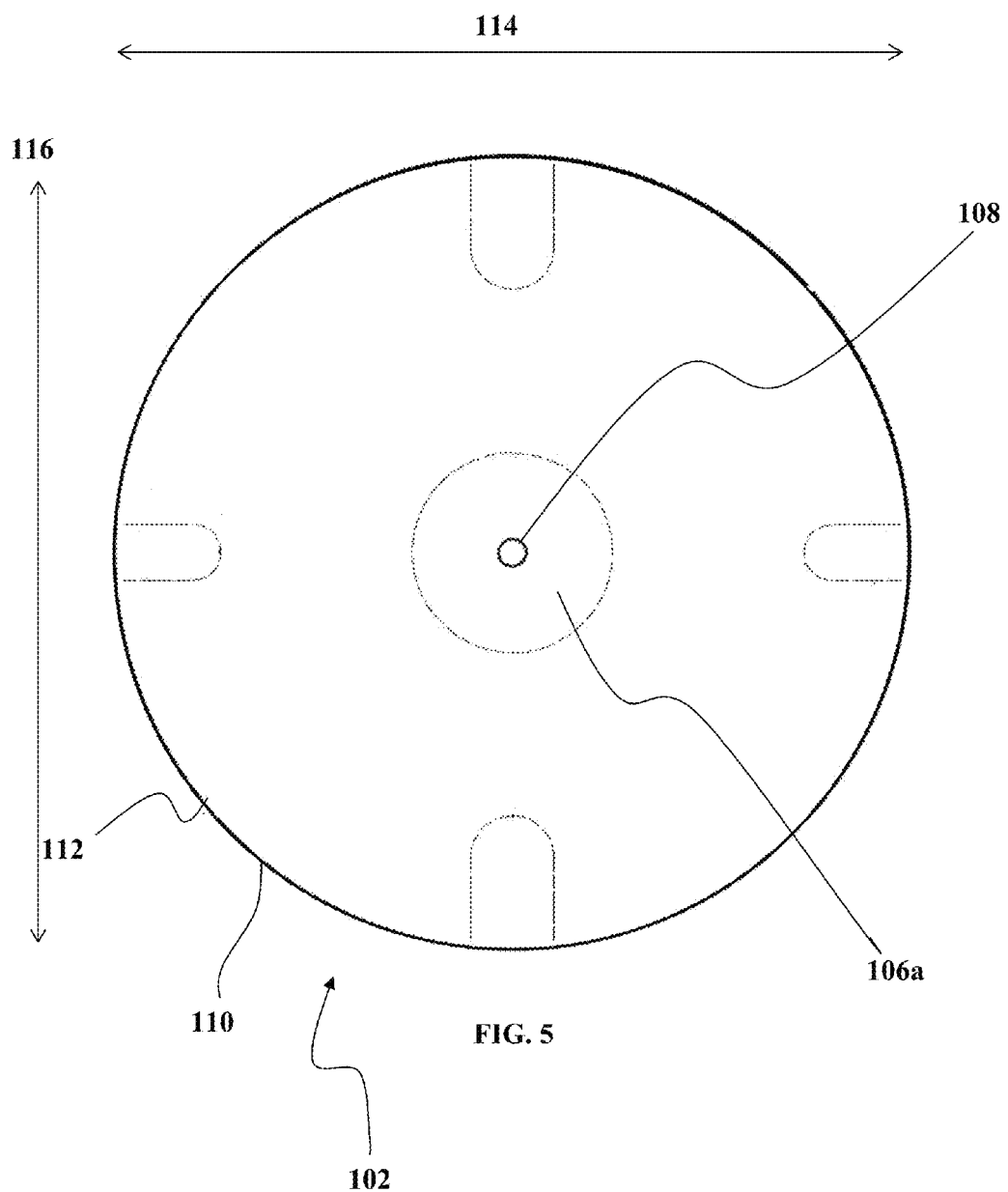
FIG. 5 is a top view of the mounting disk of FIG. 3.

Referring more specifically to FIGS. 3 and 5, mounting disk 102 can be formed to have mounting perimeter 110. Mounting perimeter 110 is generally configured such the mounting disk is at least partially insertable into the interior portion 54. In various embodiments, mounting perimeter 110 can comprise a non-round or out of round orientation 112 such as an oval or similar non-round shape having a first diameter 114 and a second diameter 116. First diameter 114 is generally selected so as to be less than inner diameter 58 of the housing 52 while the second diameter 116 is selected so as to generally slightly exceed the inner diameter 58.

Figure 6:
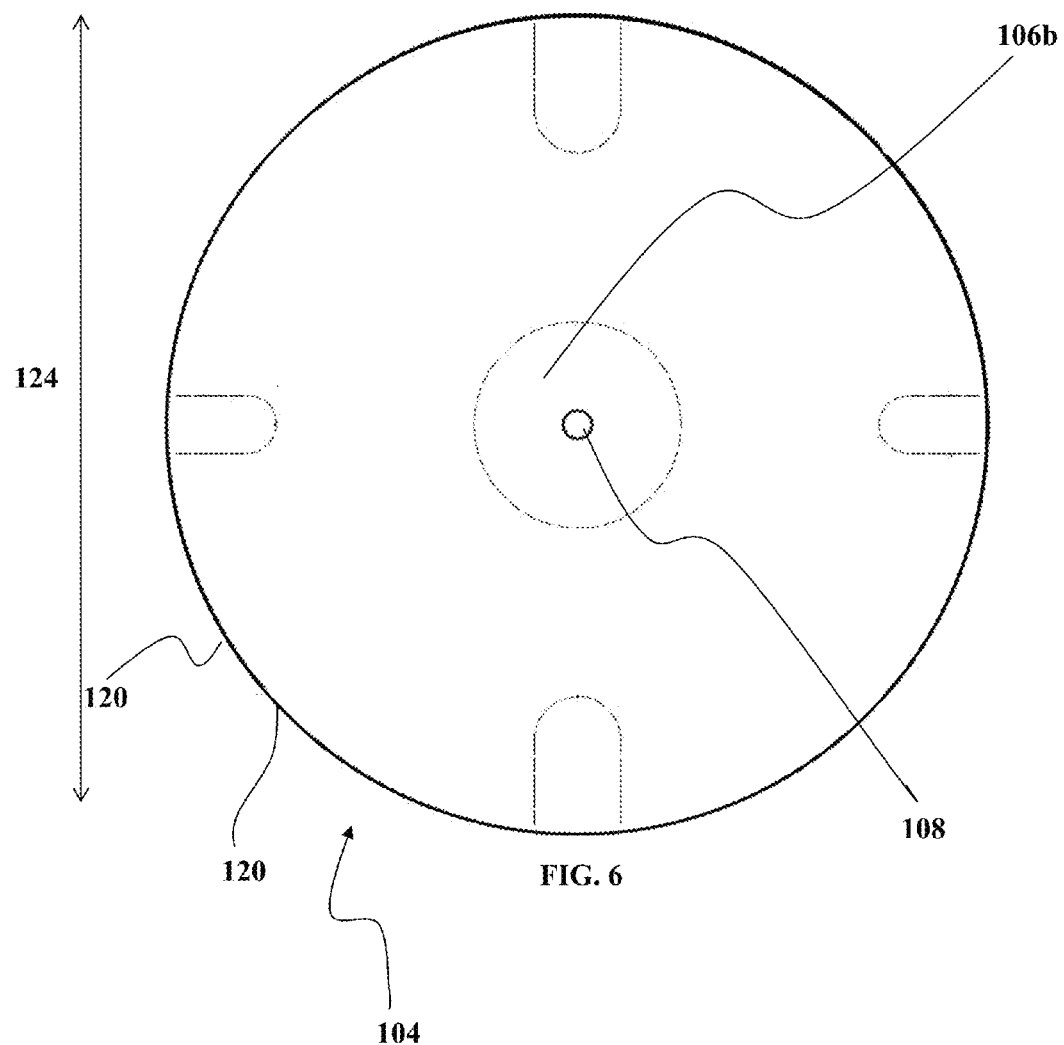
FIG. 6 is a top view of the seeker disk of FIG. 4.

As illustrated in FIGS. 4 and 6, seeking disk 104 is generally formed to have a seeking perimeter 120. In various embodiments, seeking perimeter 120 can comprise either a round, non-round or out of round (oval or similar non-round shape) orientation 122 having a seeking diameter 124. Seeking diameter 124 is generally selected so as to be less than the inner diameter 58 of the housing 52 and less than both of the first diameter 114 and second diameter 116.

Figure 7:
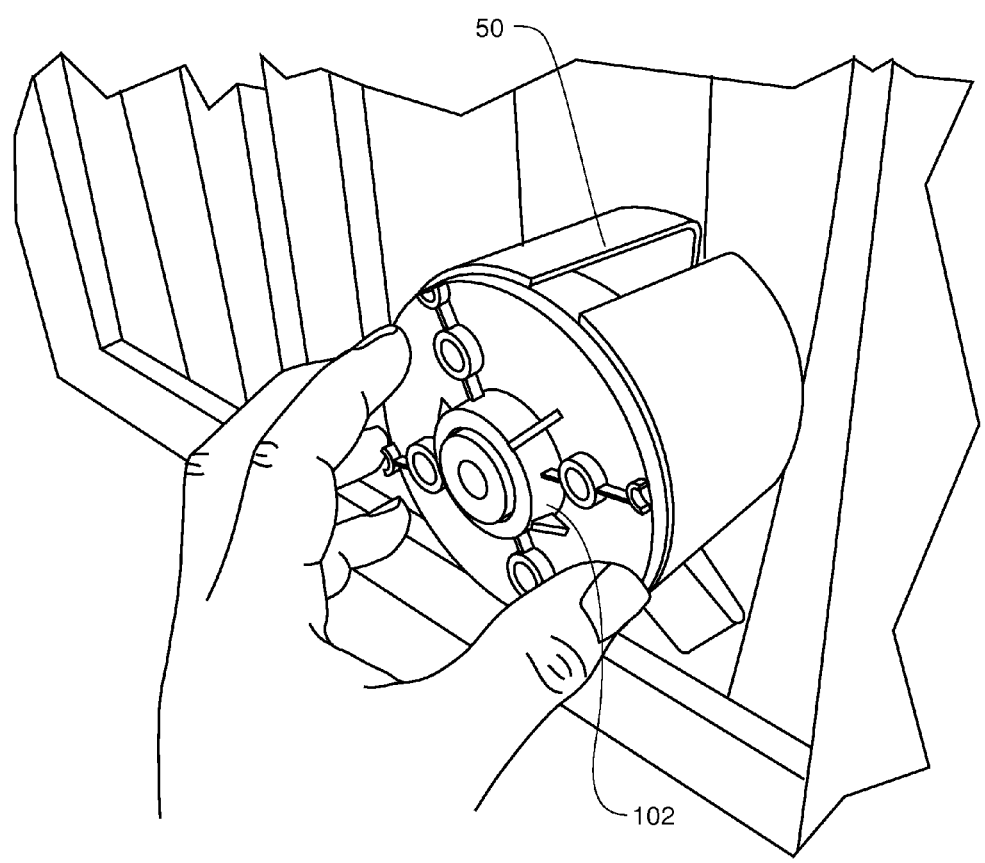
FIG. 7 is a perspective view of the mounting disk of Figure being coupled to the electrical box of FIG. 1.
Figure 8:
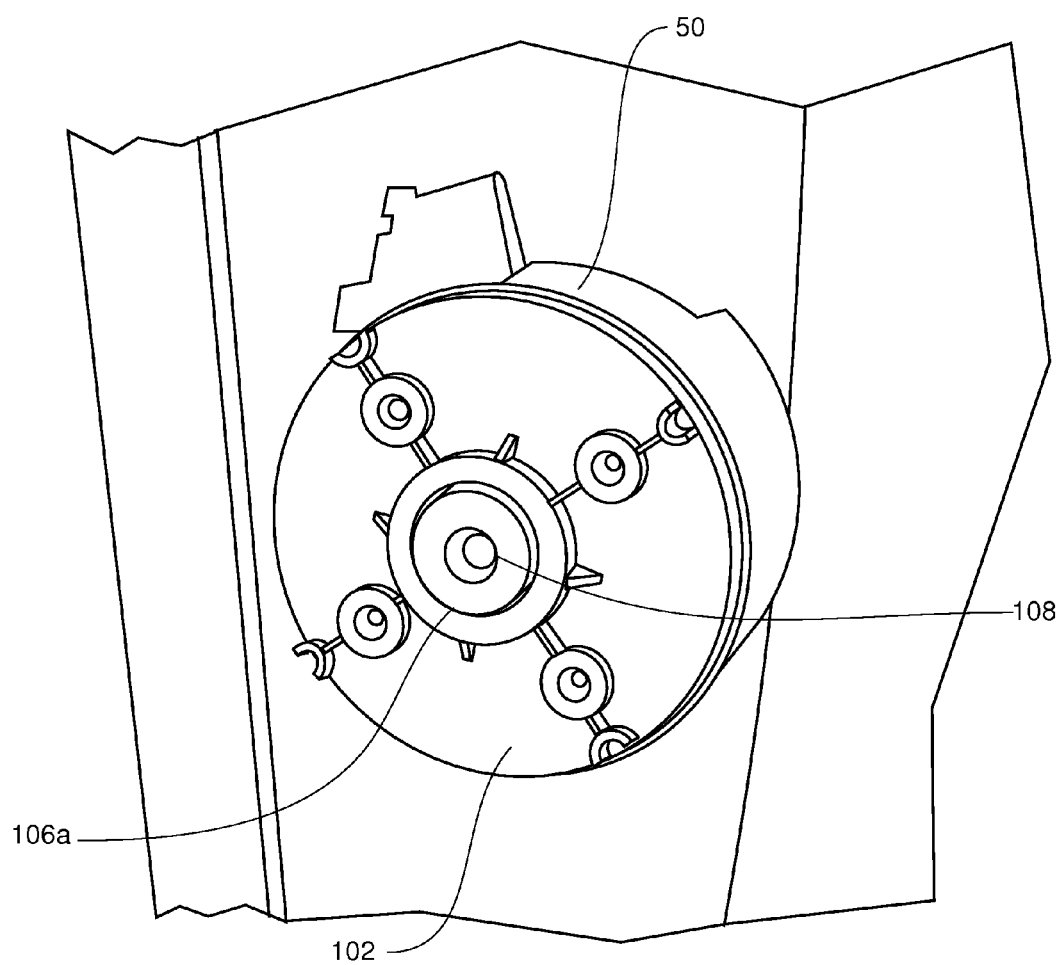
FIG. 8 is a perspective view of the mounting disk of FIG. 3 coupled to the electrical box of FIG. 1.

Referring to FIG. 7, locator system 100 is generally utilized to locate electrical box 50 by first positioning the mounting disk 102 within opening 60. Generally, mounting disk 102 is angled slightly such that the mounting disk 102 is positioned within interior portion 54. Mounting disk 102 is then oriented so as to reside in an almost flush orientation across the mounting surface 62 as shown in FIG. 8. Mounting disk 102 will not be completely flush as the increased diameter of second diameter 116 prevents a completely flush mount. Due to the second diameter 116 slightly exceeding inner diameter 58, the mounting perimeter 110 pushes against and slightly expands the perimeter wall 55 in a camming action such that the mounting disk 102 is essentially wedged into and coupled to the electrical box 50 as the perimeter wall 55 is slightly displaced/deflected. Generally, this coupling of the mounting disk 102 to the electrical box 50 occurs following the wiring of the electrical box 50 and prior to enclosing a stud wall with Sheetrock® or wallboard, whereby the electrical box 50 including mounting disk 102 is covered with the Sheetrock® or wallboard.

Figure 9:
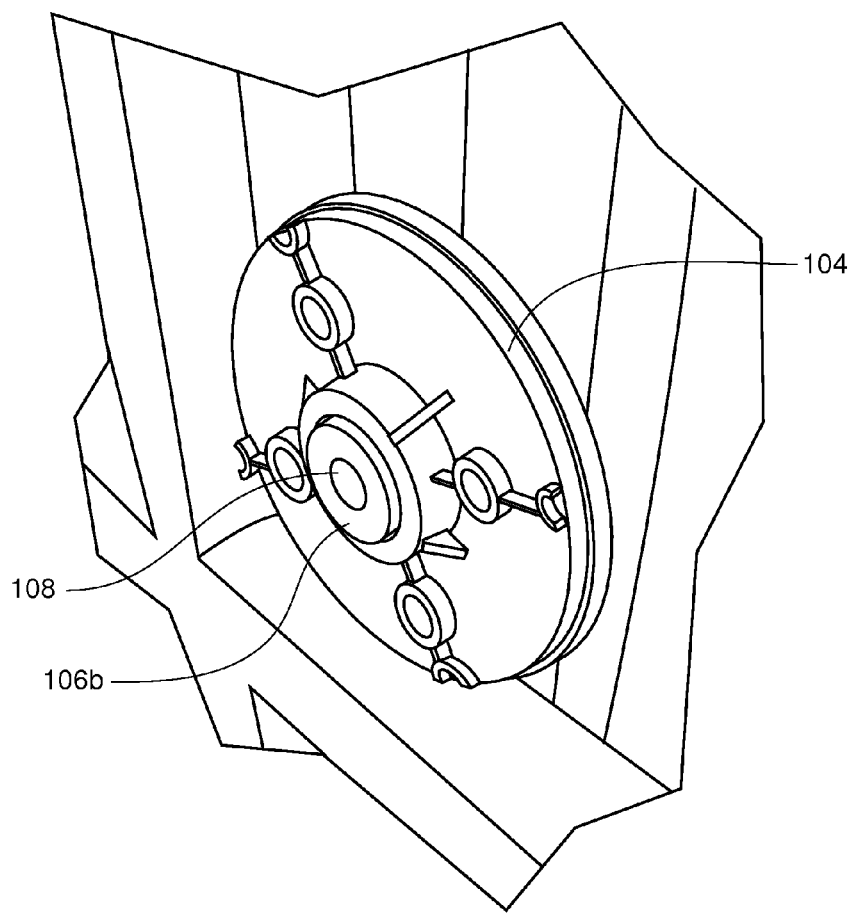
FIG. 9 is a perspective view of the seeker disk of FIG. 4 identifying the location of the mounting disk of FIG. 3.

Next, the seeking disk 104 is positioned flat against the Sheetrock® or wallboard and moved back and forth across the Sheetrock® or wallboard in an area believed to be covering the electrical box 50 as shown in FIG. 9. The magnetic attraction between mounting magnet 106a and seeking magnet 106b result in an essentially perfect alignment of the mounting magnet 106a and seeking magnet 106b, such that the seeking disk 104 essentially identifies the exact location of the electrical box 50 including the perimeter wall 55. A user can then utilize a hole saw to essentially cut-out the exact shape of the electrical box 50 by directing the drill bit through the central aperture 108 of the seeking magnet 106b. The hole saw is generally selected to have the same diameter as the electrical box 50. Due to the reduced seeking diameter 124 of the seeking disk 104, the seeking disk is essentially captured within the hole saw as the hole saw cuts through the sheet rock. As the hole saw finishes cutting the Sheetrock® or wallboard, the magnetic attraction between mounting magnet 106a and seeking magnet 106b essentially causes the mounting disk 102 to be pulled from the electrical box 50 whereby the cut Sheetrock® or wallboard is captured between the mounting disk 102 and seeking disk 104.

Locator system 100 as described and used provides a number of advantages. First, the non-round orientation 112 allows the seeker disk 102 to be physically coupled to the electrical box 50 without the use of additional fasteners or additional retention structures so as to reduce the cost of the seeker disk. Secondly, the central apertures on the mounting disk 102 and seeking disk 104 are perfectly aligned prior to the cutting of the Sheetrock® or wallboard such that following the cutting of the Sheetrock® or wallboard, the mounting disk 102, cut sheet rock and seeking disk 104 are removed thereby exposing the electrical box 50.

Figure 10:
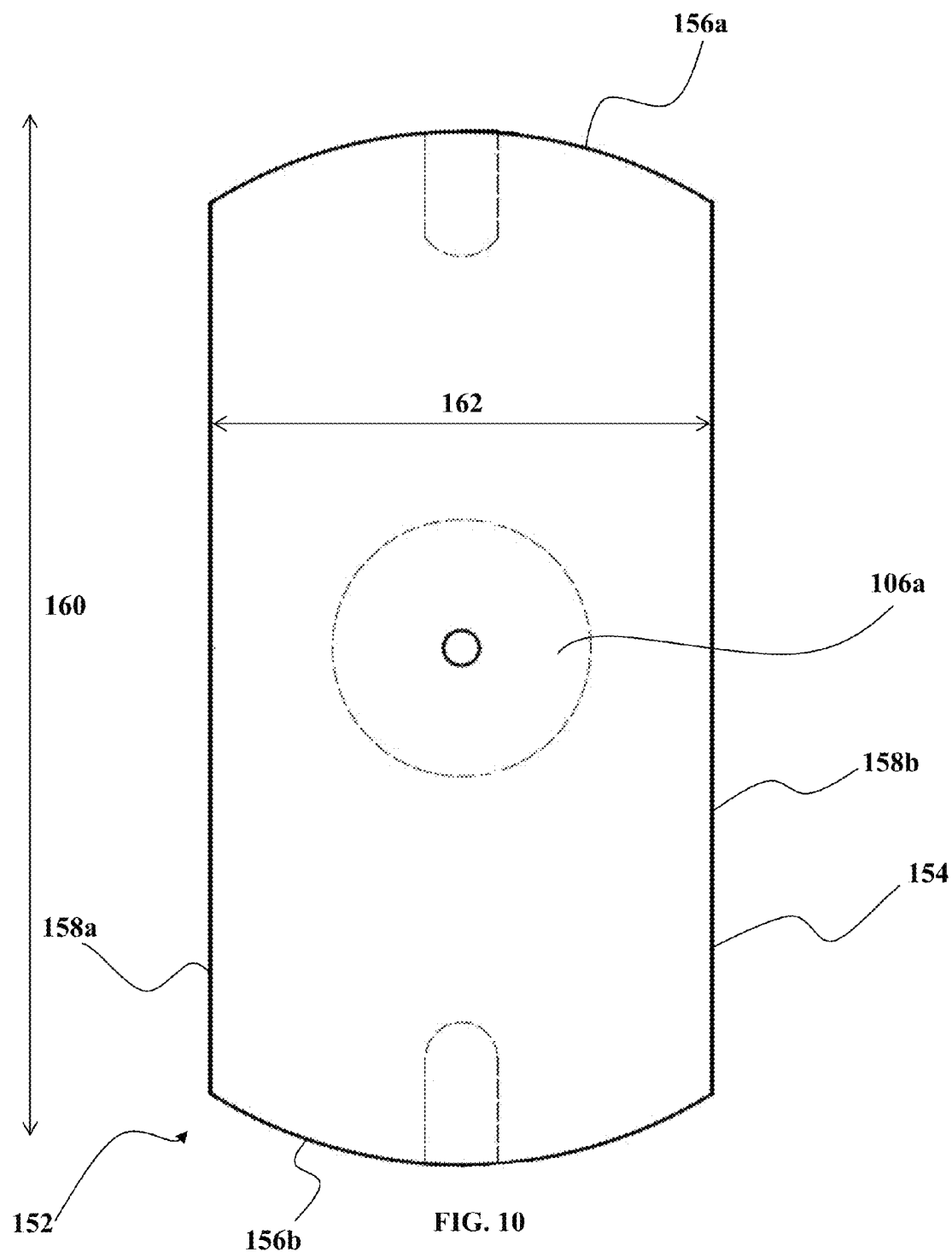
FIG. 10 a top view of a mounting disk according to an embodiment of the present invention.

An alternative embodiment of a mounting disk 152 can be constructed so as to reduce material and therefore material costs as shown in FIG. 10. Generally, mounting disk 152 can have a non-round perimeter 154 including a pair of opposed arcuate portions 156a, 156b and a pair of opposed sides 158a, 158b. A first diameter 160 defined between the opposed arcuate portions 156a, 156b can slightly exceed the inner diameter 58 while a second distance 162 between the opposed sides 158a, 158b is significantly less than the inner diameter 58.

Generally, mounting disk 152 is angled slightly such that the mounting disk 152 is positioned within interior portion 54. Mounting disk 152 is then oriented such that the opposed arcuate portions 156a, 156b contact the perimeter wall 55 in a camming action such that mounting disk 152 resides in an almost flush orientation across the mounting surface 62. Mounting disk 152 will not be completely flush as the increased diameter of first diameter 160 prevents a completely flush mount. As the first diameter 160 slightly exceeds the inner diameter 58, the arcuate portions 156a, 156b push against and slightly expand or otherwise displace/deflect the perimeter wall 554 such that the mounting disk 152 is wedged into and coupled to the electrical box 50. Generally, this coupling of the mounting disk 102 to the electrical box 50 occurs following the wiring of the electrical box 50 and prior to enclosing a stud wall with Sheetrock® or wallboard, whereby the electrical box 50 including mounting disk 102 is covered with the Sheetrock® or wallboard. Following attachment of the mounting disk 152 to the electrical box 50, seeking disk 104 can be utilized as previously described to identify the location of the electrical box 50 in a stud wall. During cutting of the sheet rock, the magnetic attraction between the mounting magnet 106a and seeking magnet 106b will again cause the mounting disk 152 to be removed from the electrical box 50 as the sheet rock is cut.

Figure 11:
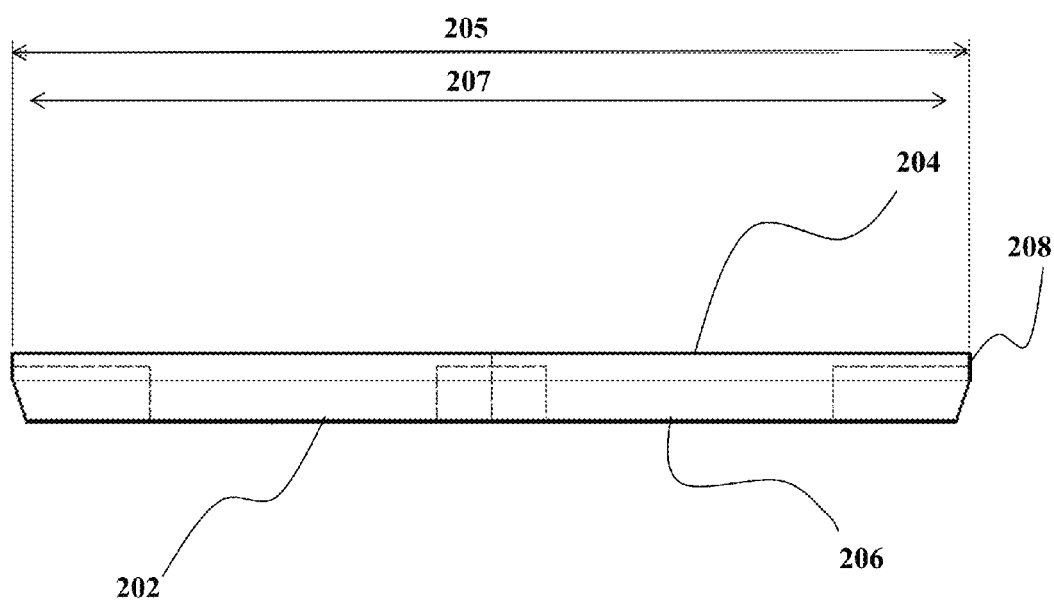
FIG. 11 is a side view of a mounting disk according to an embodiment of the present invention.

Another alternative embodiment of a mounting disk 202 can be similarly configured so as to at least partially insert into the interior portion 54 of electrical box 50 as seen in FIG. 11. Generally, mounting disk 202 includes an exterior circular surface 204 and an interior circular surface 206. Generally, the exterior circular surface 204 has an exterior locator diameter 205 at least slightly exceeding the inner diameter 58 while the inner circular surface 206 has an inner locator diameter 207 smaller than the inner diameter 58. Mounting disk 202 generally has a tapered perimeter surface 208 defined between the exterior circular surface 204 and the interior circular surface 206.

In use, mounting disk 202 is oriented such that the interior circular surface 206 is pushed into the interior portion 54. As the interior circular surface 206 has an inner locator diameter less than the inner diameter 58, the mounting disk 202 advances into the interior portion 54. Eventually the increasing diameter of the tapered perimeter surface 208 eventually equals and then exceeds the inner diameter 58 causing the perimeter wall 55 to be deflected/displaced outward and the mounting disk 202 to become wedged within the electrical box 50. Following attachment of the mounting disk 202 to the electrical box 50, seeking disk 104 can be utilized as previously described to identify the location of the electrical box 50 in a stud wall. During cutting of the sheet rock, the magnetic attraction between the mounting magnet 106a and seeking magnet 106b will again cause the mounting disk 202 to be removed from the electrical box 50 as the sheet rock is cut.

Figure 12:
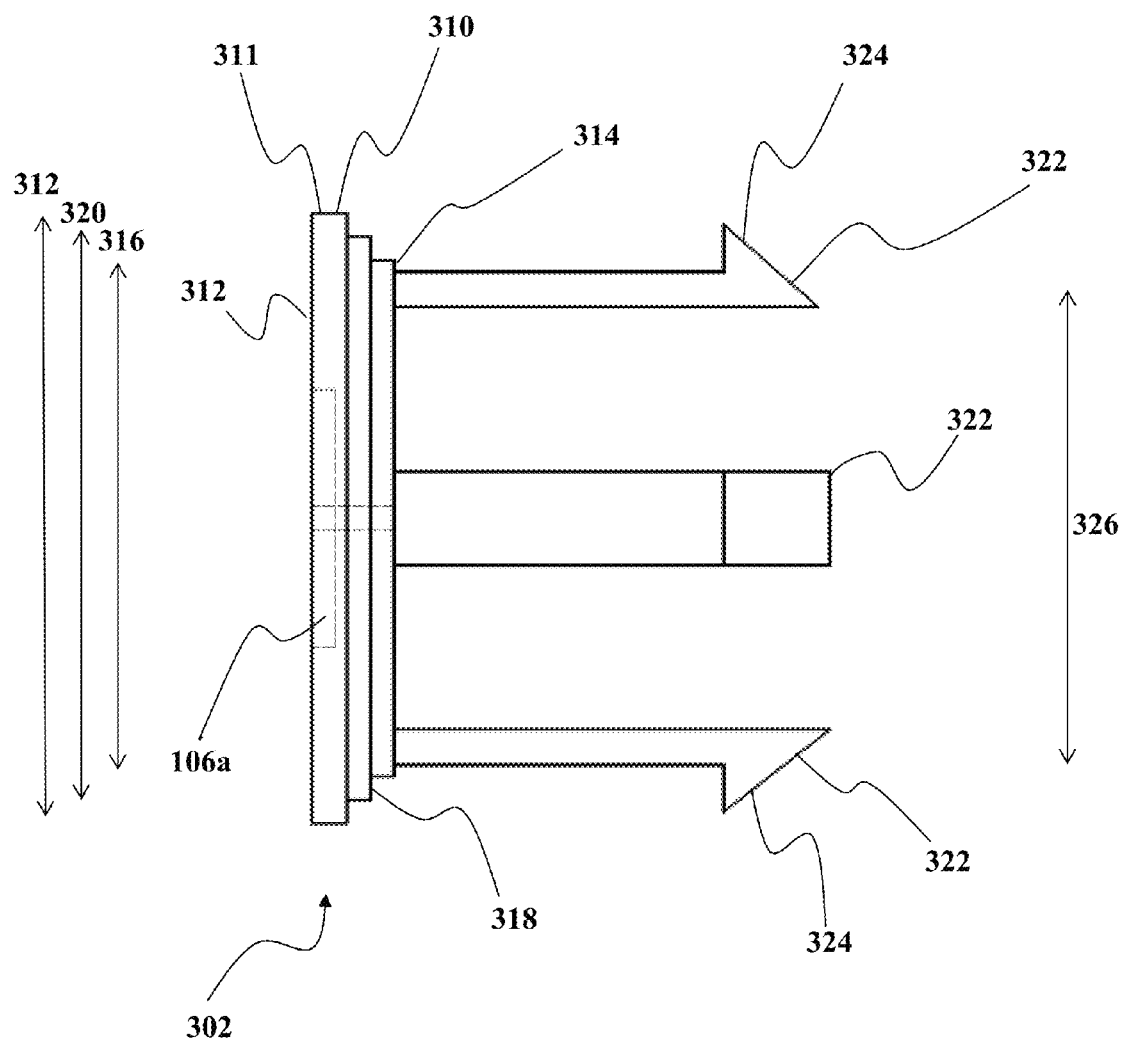
FIG. 12 a side view of a mounting disk according to an embodiment of the present invention.
Figure 13:
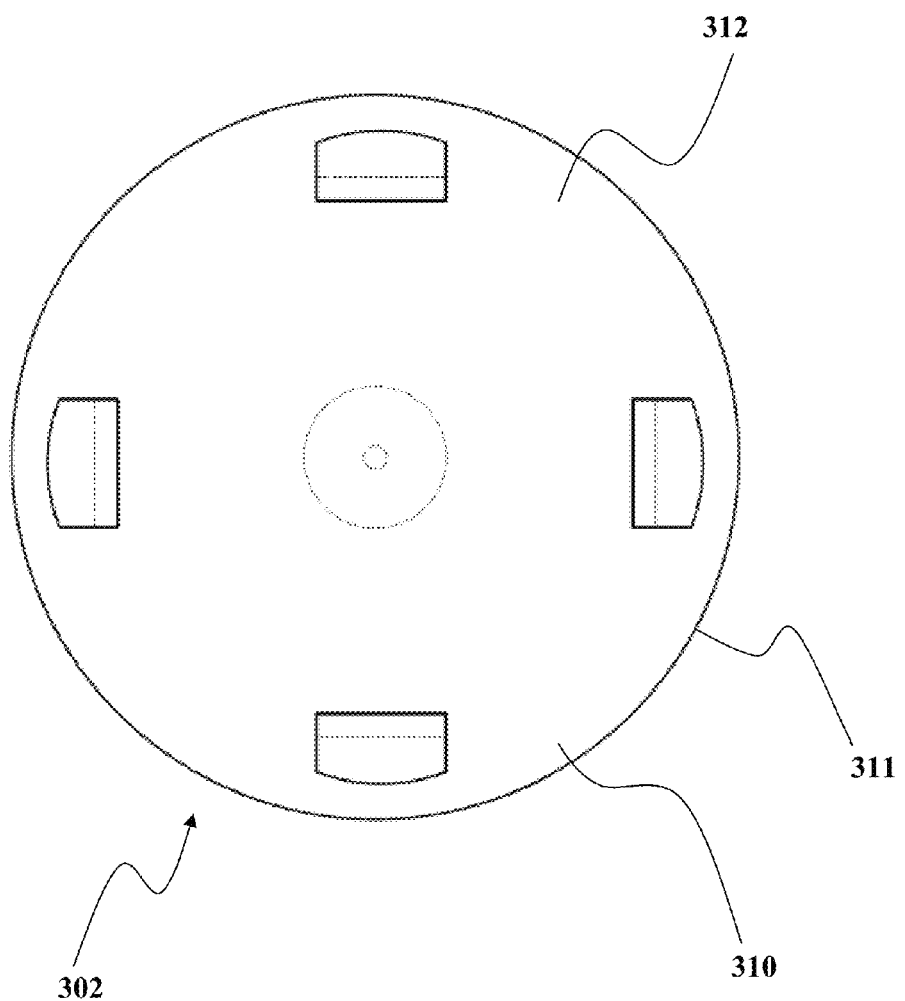
FIG. 13 is a front view of the mounting disk of FIG. 12.

In another alternative embodiment, a locator system can be utilized to identify plumbing features such as PVC piping and the like. Generally, a plumbing locator system can comprise a mounting disk 302 as shown in FIGS. 12 and 13 used with seeking disk 104. Similar to the aforementioned locator system 100, mounting disk 302 can be fabricated from a variety of suitable moldable materials including for example, polymers and copolymers such as Delrin. Mounting disk 302 includes mounting magnet 106a while seeking disk includes a seeking magnet 106b. Mounting magnet 106a and seeking magnet 106b are preferably circular and can be overmolded during the formation of the mounting disk 302 and seeking disk 104 so as to be integral to the mounting disk 302 and seeking disk 104, respectively. Alternatively, the mounting magnet 106a and seeking magnet 106b can be mounted within channels located in the mounting disk 302 and seeking disk 104. Mounting magnet 106a and seeking magnet 106b are identical in size and shape and include a central aperture 108.

Referring to FIGS. 12 and 13, mounting disk 302 can be formed to have a mounting body 310 having exterior surface 312. Mounting body 310 has a circular perimeter 311 having an exterior perimeter diameter 312. Mounting body 310 further includes an insertion surface 314 having an insertion diameter 316. Mounting body 310 further includes a flanged surface 318 having a flange diameter 320. Projecting from the insertion surface 314 are a plurality of compressible fingers 322. Each compressible finger 322 includes an exterior facing barb 324 wherein a barb diameter 326 between opposed fingers 322 exceeds the insertion diameter 316 as well an internal pipe diameter.

Generally, mounting disk 302 is coupled to a pipe stub by inserting the compressible fingers 322 into the open end of the pipe stub. As the barb diameter 326 exceeds the internal pipe diameter, the exterior facing barbs 324 contact an inner surface of the pipe and are pressed outward against the pipe. Mounting disk 302 is pressed toward the pipe stub until flanged surface 318 contacts the pipe wall and further advancement is prohibited. Mounting disk 302 is retained within the pipe stub by the outward pressing action of the compressible fingers 322. With the mounting disk 302 coupled to the pipe stub, the pipe stub can be enclosed within a floor or stud wall.

With mounting disk 302 coupled to the pipe stub, seeking disk 104 is positioned flat against the Sheetrock® or wallboard or floor and moved back and forth across the surface in an area believed to be covering the pipe stub. The magnetic attraction between mounting magnet 106a and seeking magnet 106b result in an essentially perfect alignment of the mounting magnet 106a and seeking magnet 106b, such that the seeking disk 104 essentially identifies the exact location of the pipe stub. The user then utilizes a hole saw to cut a round hole slightly larger than the circular perimeter 311 of the mounting body 310. The user positions the drill through the central aperture 108 of the seeking disk 104 before cutting the hole. Upon completion of the hole, the magnetic attraction between mounting magnet 106a and seeking magnet 106b essentially causes the mounting disk 302 to be pulled from the pipe stub whereby the cut surface is captured between the mounting disk 302 and seeking disk 104 to expose the pipe stub.

Figure 14:
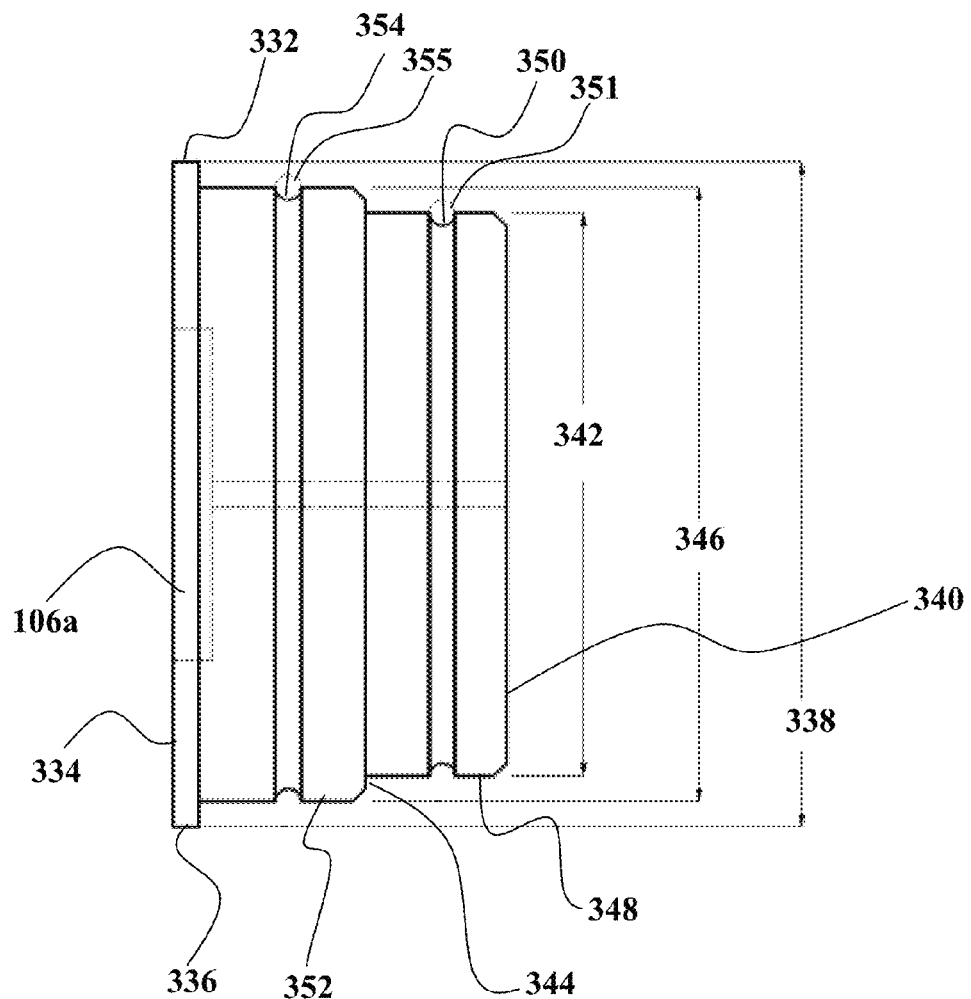
FIG. 14 is a side view of a mounting disk according to an embodiment of the present invention.

In an alternative embodiment of locator system 300, a mounting disk 330 can be formed to have a mounting body 332 having exterior surface 334 as shown in FIG. 14. Mounting body 332 has a circular perimeter 336 having an exterior perimeter diameter 338. Mounting body 332 further includes a first insertion surface 340 having a first insertion diameter 342. Mounting body 332 further includes a second insertion surface 344 having a second insertion diameter 346. Mounting body 332 includes a first insertion wall 348 including a first insertion wall sealing groove 350 and first insertion o-ring 351 while a second insertion wall 352 includes a second insertion wall sealing groove 354 and second insertion o-ring 355. The first insertion o-ring 351 and second insertion o-ring 355 can each be formed of a suitable compressible material.

Generally, mounting disk 330 is coupled to a pipe stub by inserting the insertion wall 348 into the open end of the pipe stub. Depending upon the diameter of the pipe stub, either the first insertion o-ring 351 within the first insertion wall sealing groove 350 or the second insertion o ring 355 within the second insertion wall sealing grove 354 will seal against an inner surface of the pipe and retains mounting disk 330 to the pipe stub. With the mounting disk 330 coupled to the pipe stub, seeking disk 104 is positioned flat against the Sheetrock® or wallboard or floor and moved back and forth across the surface in an area believed to be covering the pipe stub. The magnetic attraction between mounting magnet 106a and seeking magnet 106b result in an essentially perfect alignment of the mounting magnet 106a and seeking magnet 106b, such that the seeking disk 104 essentially identifies the exact location of the pipe stub. The user then utilizes a hole saw to cut a round hole slightly larger than the circular perimeter 336 of the mounting body 332. The user positions the drill through the central aperture 108 of the seeking disk 104 before cutting the hole. Upon completion of the hole, the magnetic attraction between mounting magnet 106a and seeking magnet 106b essentially causes the mounting disk 330 to be pulled from the pipe stub whereby the cut surface is captured between the mounting disk 330 and seeking disk 104 to expose the pipe stub.

The use of mounting disk 330 having a plurality of insertion walls with varying diameters allows a single mounting disk 330 to be used with a variety of different pipe and tubing sizes. As will be understood, mounting disk 330 can have a multitude of varying insertion walls and diameters so as to provide increased utility to the mounting disk 330.

While the invention is amenable to various modifications and alternative forms, specifics thereof have been shown by way of example in the drawings and described in detail. It is understood, however, that the intention is not to limit the invention to the particular embodiments described. On the contrary, the intention is to cover all modifications, equivalents, and alternatives falling within the spirit and scope of the invention as defined by the appended claims.

The invention claimed is:

1. A construction location system, comprising:
   a mounting disk including a mounting magnet, the mounting disk including a mounting perimeter configured for insertion into an electrical box whereby the mounting perimeter engages a perimeter wall of the electrical box such that said perimeter wall is displaced and the mounting disk is coupled to the electrical box; and
   a seeker disk including a locator magnet having a central aperture,
   wherein the seeker disk is adapted to be positioned on a surface covering the electrical box such that magnetic interaction between the locator magnet and the mounting magnet results in the locator magnet and the mounting magnet being aligned on opposed sides of the surface and wherein cutting a hole through the surface as guided by the central aperture causes a hole saw to remove the seeker disk, a cut portion of the surface and the mounting disk, and
   wherein the mounting perimeter comprises a non-round perimeter, and the non-round perimeter includes a first diameter and a second diameter, wherein the first diameter is less than an opening diameter on the electrical box and the second diameter is larger than the opening diameter.

2. The construction location system of claim 1, wherein the mounting perimeter comprises a tapered perimeter, wherein an interior surface of the mounting disk has an interior diameter that is less than an opening diameter of the electrical box and an exterior surface of the mounting disk has an exterior diameter that is larger than the opening diameter of the electrical box.

3. A construction location system, comprising:
   a mounting disk including a mounting magnet, the mounting disk including a mounting perimeter configured for insertion into an electrical box whereby the mounting perimeter engages a perimeter wall of the electrical box such that said perimeter wall is displaced and the mounting disk is coupled to the electrical box; and
   a seeker disk including a locator magnet having a central aperture,
   wherein the seeker disk is adapted to be positioned on a surface covering the electrical box such that magnetic interaction between the locator magnet and the mounting magnet results in the locator magnet and the mounting magnet being aligned on opposed sides of the surface and wherein cutting a hole through the surface as guided by the central aperture causes a hole saw to remove the seeker disk, a cut portion of the surface and the mounting disk, wherein the mounting perimeter comprises a non-round perimeter, wherein the non-round perimeter includes a first distance defined between a pair of opposed sides and a first diameter defined between a pair of actuate positions and wherein the first distance is less than an opening diameter of the electrical box and the first diameter exceeds the opening diameter.

4. A method for locating a construction feature on an opposed side of a construction material, comprising:
providing a mounting disk having a mounting magnet;
inserting the mounting disk into a construction feature such that a mounting perimeter of the mounting disk engages a perimeter wall of the construction feature and causes a perimeter wall of the construction feature to be displaced, said mounting disk having a non-circular mounting perimeter, the mounting disk further comprising a first diameter and a second diameter, wherein the first diameter is less than an opening diameter on the construction feature and the second diameter is larger than the opening diameter;
providing a seeker disk including a locator magnet, the locator magnet including a central aperture; and
positioning the seeker disk against a construction material, whereby magnetic attraction between the mounting magnet and the locator magnet causes the seeker disk to be retained against the construction material so as to indicate a location of the construction feature.

5. The method of claim 4, further comprising:
cutting a hole through the construction material with a hole saw as guided by the central aperture, wherein the seeker disk, a portion of cut construction material and the mounting disk are simultaneously removed with the hole saw.

6. The method of claim 4, wherein engaging the perimeter wall of the construction feature further comprises:
providing the mounting disk wherein the mounting disk comprises an interior surface having an interior diameter that is less than an opening diameter of a construction feature and an exterior surface having an exterior diameter that is larger than the opening diameter such that the perimeter wall comprises a tapered perimeter wall for engaging the perimeter wall of the construction feature.

* * * * *